E. HODGKINSON.
PEN ARM ADJUSTING MECHANISM FOR RECORDING INSTRUMENTS.
APPLICATION FILED JULY 5, 1911.
1,060,761.
Patented May 6, 1913.
2 SHEETS—SHEET 1.
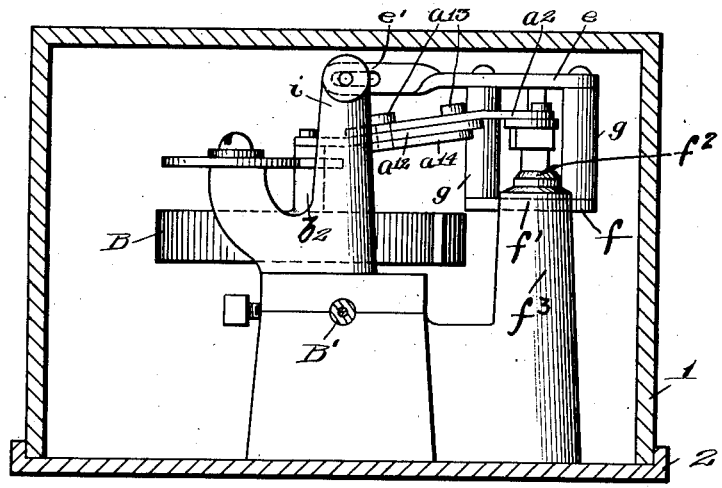
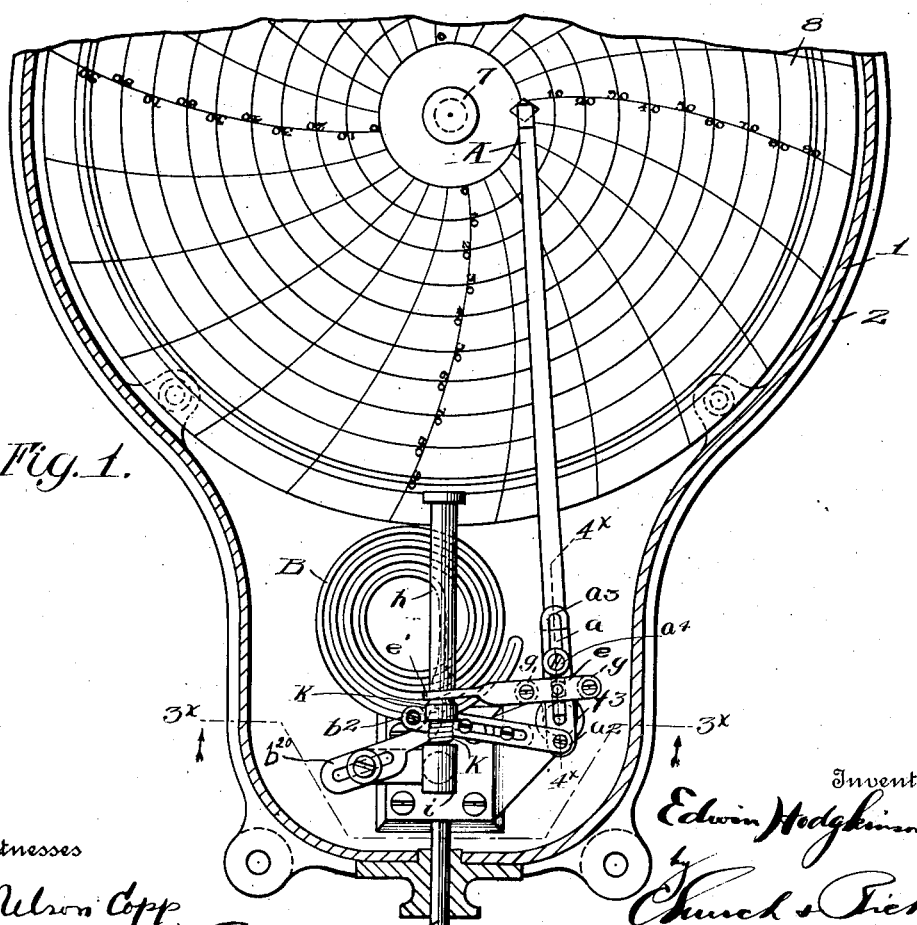

E. HODGKINSON.
PEN ARM ADJUSTING MECHANISM FOR RECORDING INSTRUMENTS.
APPLICATION FILED JULY 5, 1911.

1,060,761.

Patented May 6, 1913.

2 SHEETS—SHEET 2.

UNITED STATES PATENT OFFICE.

EDWIN HODGKINSON, OF ROCHESTER, NEW YORK, ASSIGNOR TO TAYLOR INSTRUMENT COMPANIES, OF ROCHESTER, NEW YORK, A CORPORATION OF NEW YORK.

PEN-ARM-ADJUSTING MECHANISM FOR RECORDING INSTRUMENTS.

1,060,761.     Specification of Letters Patent.     Patented May 6, 1913.

Original application filed October 3, 1910, Serial No. 585,014. Divided and this application filed July 5, 1911. Serial No. 637,010.

*To all whom it may concern:*

Be it known that I, EDWIN HODGKINSON, of Rochester, in the county of Monroe and State of New York, have invented certain new and useful Improvements in Pen-Arm-Adjusting Mechanism for Recording Instruments; and I do hereby declare the following to be a full, clear, and exact description of the same, reference being had to the accompanying drawings, forming a part of this specification, and to the reference-numerals marked thereon.

My present invention relates to instruments used for indicating or recording temperatures or pressures, and particularly to those in which a continuous record is made by means of a stylus coöperating with a continuously moving surface or recording sheet.

In this connection my invention has for its object to provide an improved means for mounting and operating a stylus or pen arm whereby the latter may be conveniently adjusted initially and corrected in relation to the chart or recording sheet.

To these and other ends the invention consists in certain improvements and combinations of parts all as will be hereinafter more fully described, the novel features being pointed out in the claims at the end of the specification.

Figure 2:
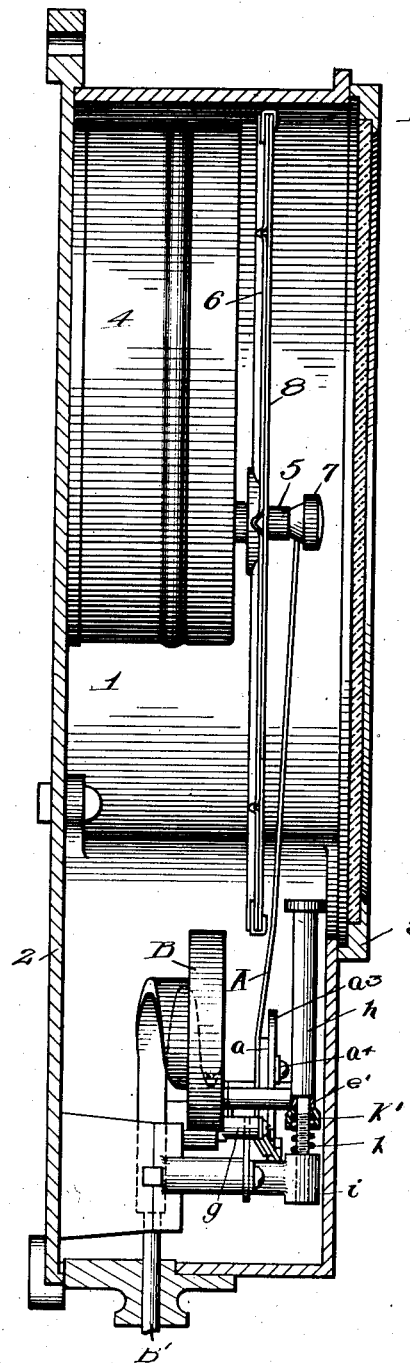
Figure 4:
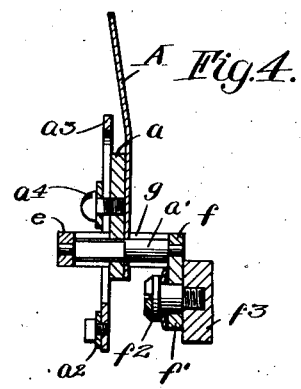

In the drawings: Figure 1 is an enlarged front elevation showing in detail the mechanism employed for operating and adjusting a stylus, part of the outer casing being shown in section; Fig. 2 is a side elevation of the parts illustrated in Fig. 1; Fig. 3 is a sectional view taken on the line $3^x$—$3^x$ of Fig. 1 looking in the direction indicated by the arrows, and Fig. 4 is a detail sectional view taken on the line $4^x$—$4^x$ of Fig. 1.

Similar reference numerals throughout the several figures indicate the same parts.

This application is a divison of my prior application, Serial No. 585,014, filed October 3, 1910, for indicator and recorder.

In illustrating my present invention I have shown it in connection with a telethermometer, an instrument used for indicating and recording continuously temperatures which are maintained for given periods of time in carrying out different processes of manufacture, such as in enameling ovens, cooking vats, kettles, or the like.

Generally the apparatus comprises a casing 1 mounted upon the backing 2 which may be secured to any convenient support, the front of the casing being closed by a door 3 provided with a glass panel. Within the casing is a clock train preferably protected by a covering 4 through which the driven arbor 5 of the clock train projects, and on which is detachably secured a metal disk 6 held in place by a thumb screw 7 adapted to support the removable recording sheet or chart indicated by 8 provided with suitable lines or graduations.

It is essential in an apparatus of this character that a means be provided for adjusting the stylus relatively to the zero point or line of the scale, or to some other arbitrary division thereon in the first instance, and when so adjusted that it will be capable of continued accurate operation. In the illustrations showing the preferred embodiment of my invention, the arm A, supporting the stylus, is a light spring connected at its lower end to a plate $a$ rigidly attached to an arbor $a'$. The latter is journaled in a swinging or rocking frame comprising the front and rear pieces $e$, $f$, the latter having a downwardly extending end $f'$, pivoted on a screw $f^2$ secured in a post $f^3$ projecting forwardly from the supporting plate 2. The frame pieces $e$, $f$, are separated by spacing members $g$, $g$, and one end of the frame piece $e$ projects laterally, as indicated by $e'$, where it is slotted to accommodate an adjusting screw $h$, the lower end of which is threaded in the outer end of the bracket $i$. The upper end of the screw is arranged in proximity to the lower edge of the door opening in the casing where access may be conveniently had to it. The screw is also provided with a shoulder which engages the upper edge of the arm $e$ with which the latter is held in contact by a coil spring $k$, its upper end being inclosed in a cap $k'$. From this arrangement of the parts it will be observed that by rotating the screw in one direction or the other the arm $e$ will be depressed to rock the frame about the screw $f^2$, thus shifting the position of the arbor $a'$, the slight movement occurring at this point being sufficient to cause the stylus to be shifted laterally to a considerable distance. The motor mechanism for operating the pen arm in the present instance is shown as the spirally curved extremity B of a capillary or thermometer tube B', the opposite extremity of which is provided with a bulb containing an expansive fluid such as mercury, which, when affected by temperature, will impart to the spiral B a tendency to straighten out, as will be understood. It will be understood, however, that the spiral B may be a Bourdon tube, in which event the shank B will be connected to the source of pressure supply, such as a steam or air pipe, the variations of pressure in which will cause the curved tube to distend or contract and thus impart movement to the stylus.

An articulated connection is provided between the arm A and the spiral or active end of the capillary tube comprising a link $a^2$, which is pivoted to the end of the arms and to a post or projection $b^2$ attached to the outer convolution of the spiral B. In forming this operating connection I provided therein means for accomplishing two adjustments of the stylus, both of which are independent of the swinging of the arbor $a'$ around its pivotal support $f^2$ by means of the set screw $h$. In carrying out this feature of my invention instead of connecting the arm $a^2$ directly to the arm A, I interpose between these parts a slotted link $a^3$ which is held in adjusted position by a set screw $a^4$, the lower end of the link forming an extension of the arm A, and adjustable vertically relatively to the pivot $a'$ for the purpose of determining the amplitude of the movement to be given the stylus, which it will be understood depends upon the range through which the instrument is adapted to operate, and dependent upon the amount of movement which it is expected to obtain in the active end or spiral B of the capillary tube. This adjustment also affords a means of setting the stylus for making records upon charts of different sizes or chart sheets having different forms of graduations. The second adjustment, referred to above, operates in conjunction with the shifting action of the pivot $a'$ and is accomplished by making the arms $a^2$ in two parts, the second part comprising the link $a^{12}$ (Fig. 3) both the latter and the part $a^2$ being slotted and overlapping and rigidly clamped together by set screws $a^{13}$ carried in a clamping plate $a^{14}$. By loosening the screws $a^{13}$ the length of the arm may be increased or diminished to position the pen point or stylus in the approximate position desired in reference to the zero line or any other graduation on the chart, and should it be necessary to afterward shift the position of the pen point this may be accomplished by the finer adjustment afforded by the set screw $h$.

An adjustable stop $b^{20}$, the inner curved end of which, shown in dotted lines, is positioned to engage the forwardly extending projection $b^2$ and the spiral portion of the capillary and limit its movement in one direction. This stop is provided for the purpose of preventing the upper end of the stylus from engaging the thumb screw 7 at the center of the chart when the spiral B contracts.

An adjusting mechanism embodying my invention is simple in construction and consisting of few parts which may be readily assembled, the several elements being designed and arranged to afford a means of readily and accurately positioning the pen relatively to the chart.

I claim as my invention:

1. In a recording instrument, the combination with a support, a movable chart and a pressure actuated member having an active portion, of a pivoted arm having a stylus coöperating with the chart, a member connecting said active portion and said arm for imparting movement from the former to the latter, an adjustable cradle supporting the pivot of the arm and an adjusting member carried on the support and coöperating with the cradle for shifting the position of the pivot and moving the arm relatively to the chart.

2. In a recording instrument, the combination with a support, a movable chart and a pressure actuated member having an active portion, of an arm pivoted to the support having a stylus engaging the chart, an operating connection between the arm and said active portion, a movable cradle carrying the pivot of the arm, a finger on the cradle and an adjusting screw coöperating with the support and finger for shifting the position of the cradle to vary the position of the pivotal point of the arm.

3. In a recording instrument, the combination with a support, a movable chart and a pressure actuated member having an active portion, of a cradle pivoted to the support, a stylus arm pivoted on the cradle, the pivotal points of the cradle and arm being offset relatively to each other, an operating connection between the arm and said active portion and means for adjusting the cradle in its pivot to shift the position of the pivot of the stylus.

4. In a recording instrument, the combination with a support, a movable chart and a pressure actuated member having an active portion, of a carriage movably mounted on the support, a stylus arm pivoted on the carriage, an operating connection between said arm and said active portion, and means for shifting the carriage to adjust the pivotal point of the arm relatively to said active portion to rock the arm in one direction or the other.

5. In a recording instrument, the combination with a support, a chart, an operating member having a part adapted to be actuated by fluid under pressure, of a rocking frame pivoted on the support, an indicating arm pivoted on the frame and coöperating with said chart, a laterally extending arm on said frame, an adjusting screw coöperating with the arm and threaded in the support to shift the arm relatively to the chart, and an operating connection between said member and arm.

6. In a recording instrument, the combination with a support and a movable chart, an operating member and an adjustable bearing frame, and an indicating arm pivoted on the latter, of an adjustable connection between the member and arm for swinging the latter relatively to the chart and means for shifting the frame to alter the position of the pivot point of the arm.

7. In a recording instrument, the combination with a support, the active spirally wound end of a fluid pressure operated tube mounted on the support, a frame piece adjustably held on the support and a stylus arm journaled on the frame, of a rigid operating connection attached to the arm at one side of its pivot and connected to said end of the tube and means for shifting the frame to move the pivot of the arm relatively toward and from said tube.

EDWIN HODGKINSON.

Witnesses:
HENRY S. KIMMEL,
CURTIS D. HART.